April 29, 1958  C. D. GALLOWAY  2,832,126
METHOD OF AND APPARATUS FOR SIZING
Filed Aug. 13, 1952  5 Sheets-Sheet 1

INVENTOR.
CHARLES D. GALLOWAY
BY
ATTORNEY

April 29, 1958

C. D. GALLOWAY 2,832,126

METHOD OF AND APPARATUS FOR SIZING

Filed Aug. 13, 1952

INVENTOR.
CHARLES D. GALLOWAY
BY
ATTORNEY

April 29, 1958   C. D. GALLOWAY   2,832,126
METHOD OF AND APPARATUS FOR SIZING
Filed Aug. 13, 1952   5 Sheets-Sheet 4

INVENTOR.
CHARLES D. GALLOWAY
BY
ATTORNEY

April 29, 1958

C. D. GALLOWAY 2,832,126

METHOD OF AND APPARATUS FOR SIZING

Filed Aug. 13, 1952

INVENTOR.
CHARLES D. GALLOWAY
BY
ATTORNEY

United States Patent Office 2,832,126
Patented Apr. 29, 1958

2,832,126

METHOD OF AND APPARATUS FOR SIZING

Charles D. Galloway, Wyndmoor, Pa., assignor to The Electric Storage Battery Company, a corporation of New Jersey Application August 13, 1952, Serial No. 304,153

7 Claims. (Cl. 29—76)

The present invention relates to battery grid sizing machines and has for an object the provision of a method of and a machine for sizing or trimming the faces of battery grids to render such faces smooth and the grids uniform in thickness.

In the manufacture of plates for storage batteries, both the negative and positive plates comprise a metal grid produced by a casting process in a mold having a configuration to produce a reticulated structure, preferably of cross members. This structure is such that a paste of active material, such as lead oxide, can be applied and retained by the grid to form a plate. While the grids may be cast or molded by many known processes, normally the grids are produced in automatic casting machines in which the molten metal, such as a mixture containing primarily lead, is introduced automatically into the mold. After cooling and hardening the grids are automatically discharged from the mold. Since it is essential that the grids be readily removable from the mold after cooling, it is necessary that the mold be coated to prevent sticking of the grid in the mold. Various coating materials have been used for this purpose, such as carbon black, and powdered pumice. These are applied by dusting or spraying the mold surfaces after each molding operation.

It is extremely difficult to obtain a uniformly thin and even coating of the mold and, consequently, the grids have inherently present therein inequalities in thickness. Additionally, the molds themselves are subjected to wear and distortion under heat and pressure, so that the resulting grids produced therein may be non-uniform in thickness and contain protuberances above the normally smooth surfaces. Various other causes of unevenness of the grids may result from inaccuracy or slippage of adjustments of the casting machine and the molds. Additionally, imperfections in grids result from the subsequent handling and treatment thereof prior to the application of paste to the grids.

While the variations in plate thickness and the irregularities appearing on both faces of the grid may not be very great, being of the order of a few thousandths of an inch, any such variations in thickness and irregularities in the faces of the grids tend to produce similar irregularities in the pasted plates. These irregularities in the finished, pasted plates result from the surfaces of the grids, since the smoothing or wiping operation, after the paste is applied to the grid, is generally guided by the surfaces of the grids. Thus, with the faces of the grid being uniform and smooth, there is produced a plate of more uniform thickness and a considerable saving is effected in the lead paste applied to the grids.

Sizing machines have been known in the prior art, such as disclosed in Lund Patent No. 2,098,808. In that patent there is shown a machine having milling cutters located at horizontally spaced locations and each adapted successively to engage a single side of a grid. Such sizing machines do not produce a uniform thickness throughout the face of an individual grid. This is due to the fact that cutters must necessarily be spaced apart to permit successive cuts on the opposite sides of the grid, and such spacing makes it necessary to feed a plurality of grids successively through the machine requiring considerable care in the adjustment of the cutters.

Additionally, it has been found that if an imperfection or unevenness in the surface of the grid occurs on the side opposite that face first contacted by the milling cutter, the grid is unable to recognize this imperfection except as a difference in total thickness. Accordingly, the milling cutter unnecessarily trims the wrong side of the plate. When the same plate subsequently passes over the milling cutter on the side where the imperfection occurs, the plate is either reduced in thickness to a greater extent than necessary or the imperfection is not removed and the face of the grid is not made smooth.

In the preferred form of the present invention a grid sizing machine is provided in which the grid passageway is defined by grid-driving means including a pair of cooperating power-driven feed rollers spaced apart and arranged to receive a grid and to advance it through the passageway into engagement with a pair of opposed oscillatory cutters spaced apart to form an extension of said passageway for simultaneously acting upon opposite surfaces of the grids as they are advanced under the action of feed rollers.

Further in accordance with the present invention, the grid-driving means includes a second pair of rollers having resilient surfaces positioned adjacent the synchronously driven oscillatory cutters. The rollers are spaced apart to form a further extension of the passageway so that each individual grid passing out of the cutters is engaged and the grid positively driven through the cutters. Preferably, the cutters are provided with cutting elements or teeth disposed at an angle to the direction of oscillation of the cutters, which in the preferred form is transverse to the direction of travel of the grids through the passageway. The spacing apart of the cutting edges of the cutters is such that the passageway is equal to the desired finished thickness of the grids.

Further objects and advantages of the present invention will become apparent from the following detailed description taken in conjunction with the accompanying drawings, in which.

Figure 1:
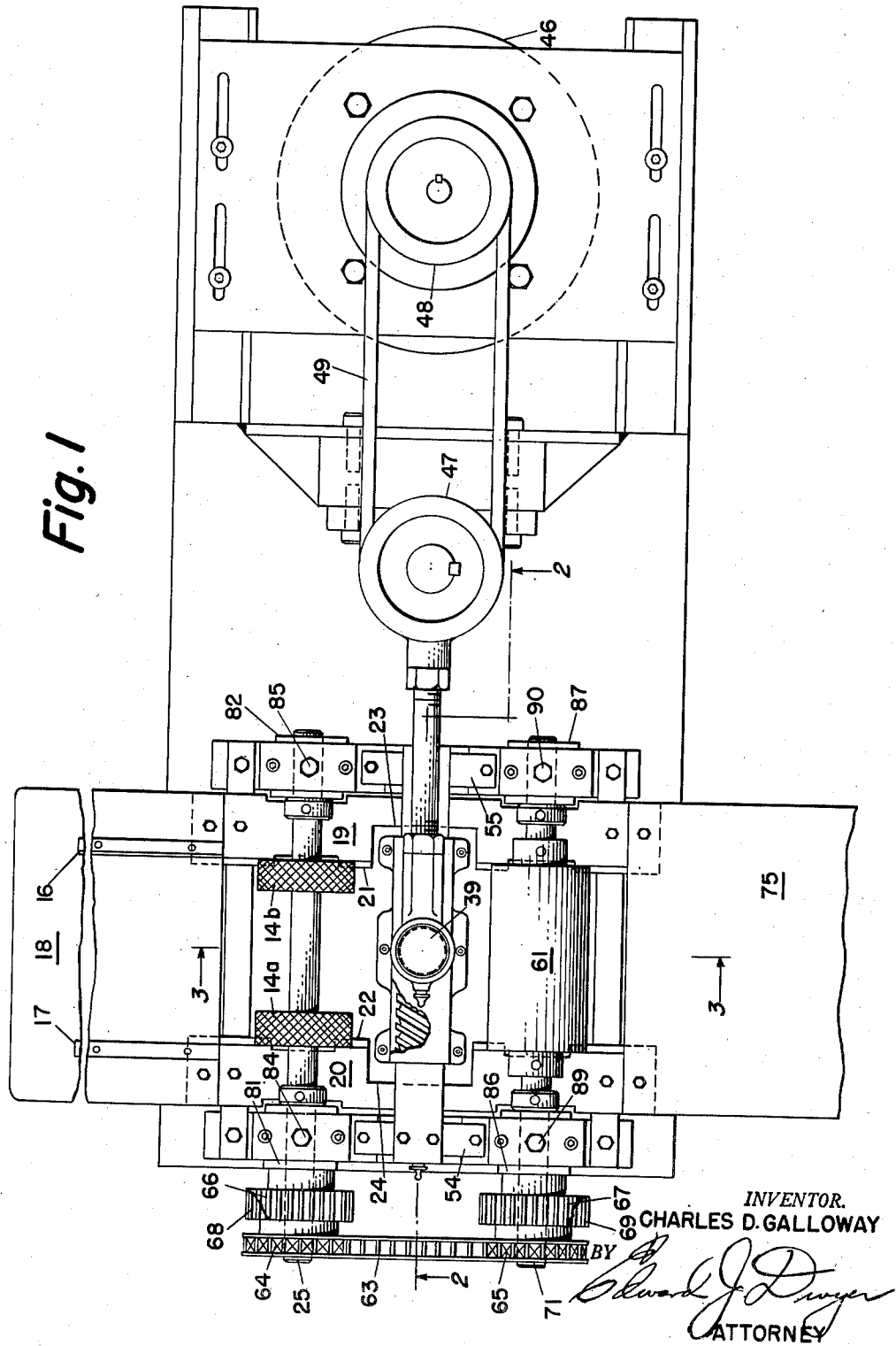
Fig. 1 is a plan view of a grid sizing machine in accordance with the present invention.
Figure 2:
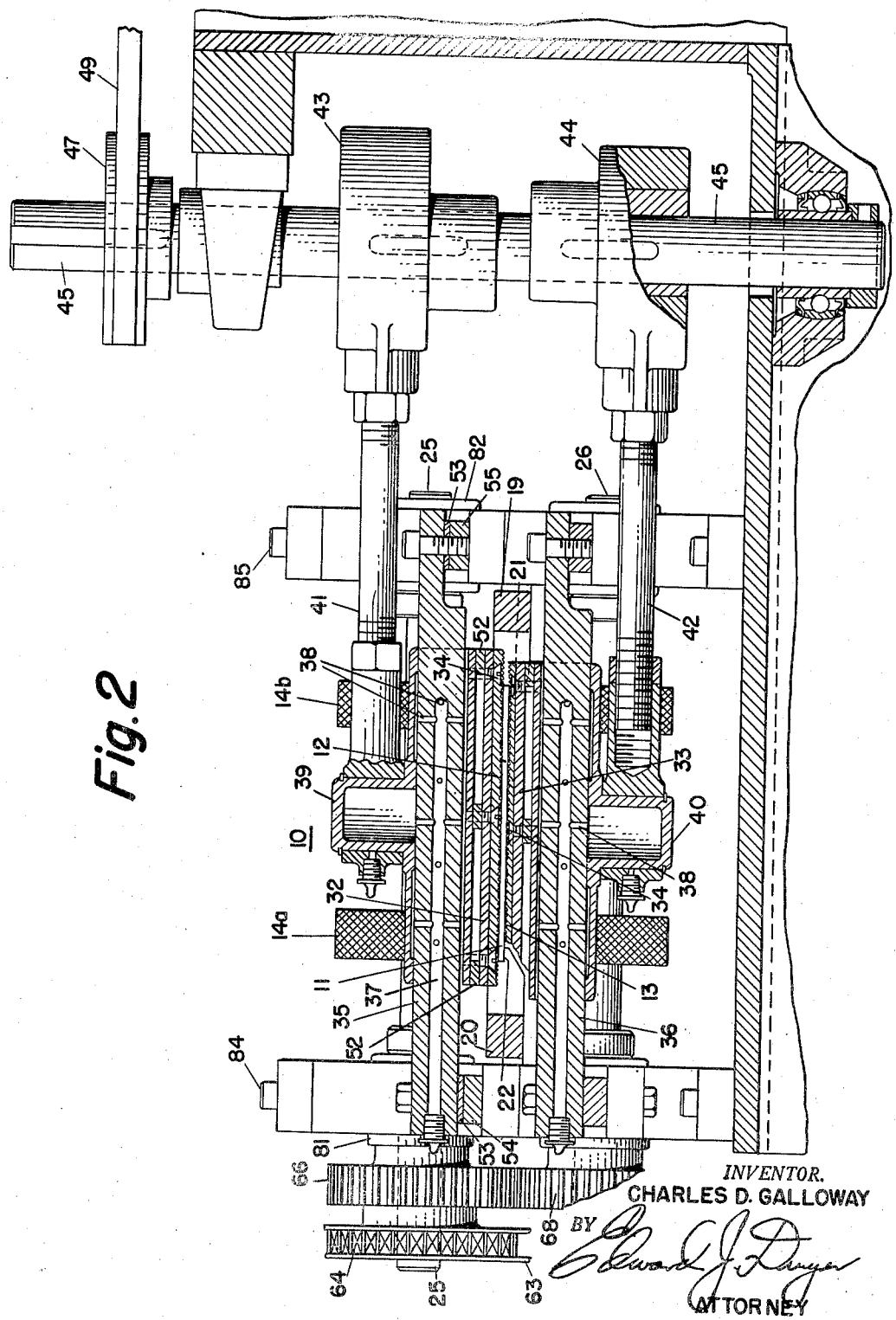
Fig. 2 is a sectional elevation view in the direction of the arrows 2—2 in Fig. 1.
Figure 3:
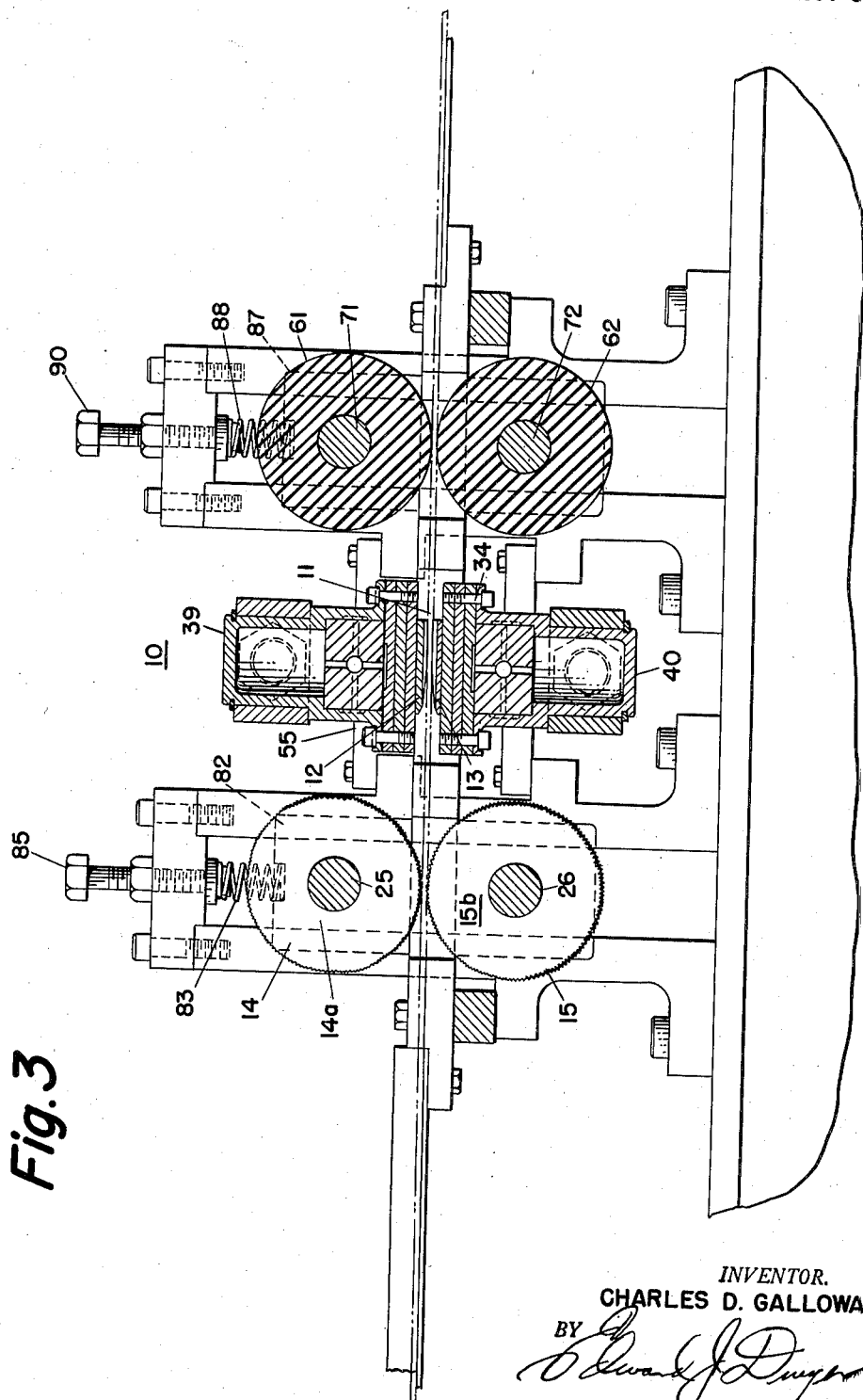
Fig. 3 is a sectional end view in the direction of the arrows 3—3 in Fig. 1.

Referring to Figs. 1–3 of the drawings, it will be observed that the grid sizing machine, designated generally as 10, is provided with a passageway 11, best seen in Fig. 3, which is in part defined by a pair of oscillatory trimmers or cutters 12 and 13 in opposed relationship. Oscillatory cutters 12 and 13 in defining a portion of passageway 11 are arranged simultaneously to act upon the opposite surfaces of individual grid plates advanced thereinto by a pair of cooperating power-driven feed rollers including the upper rollers 14 and lower rollers 15, respectively comprising knurled wheels 14a, 14b, and 15a, 15b. The knurled wheels 14a—15b are spaced apart vertically, as shown in Fig. 3, to define a portion of passageway 11 and sufficiently to permit engagement thereby of a lead grid as it is guided thereinto between the guide strips 16 and 17 mounted on the feed table 18, best seen in Fig. 1. Guide strips 16 and 17 form the entrance way for grids to passageway 11 and these strips may be considered as defining a further extension of the passageway. While the feed of grids between the guide strips 16 and 17 and through feed-roller means 14 and 15 to the oscillatory cutters 12 and 13 may be performed by automatic means, well known in the art, for simplicity the feed is shown as being performable manually as by pushing each individual grid into engagement with knurled wheels 14a—15b.

In addition to the guide strips 16 and 17 and feed-roller means 14 and 15, the passageway 11 into and through oscillatory cutters 12 and 13 is further defined by the longitudinally extending guide rails 19 and 20, best shown in Figs. 1 and 3, which extend in the direction of travel of the grid plates through the grid-trimming machine. As particularly shown in Fig. 2, guide rails 19 and 20 are formed with extending shoulders 21 and 22, respectively, which extend between the table 18, which is supported on the ends of guide rails 19 and 20, to a point adjacent the entrance of the grid plate between the knurled wheels 14a—15b and then extend from a point between the exit side of the knurled wheels and the oscillatory grid cutters 12 and 13.

It is particularly to be noted that the guide rails 19 and 20 are additionally provided with recesses 23 and 24 to permit the grid cutters 12 and 13 to reciprocate, or oscillate, transverse to the longitudinal direction of passageway 11 through the machine. By virtue of the recesses 23 and 24, the leading end of a grid, as it advances into the passageway under the action of feed rollers 14 and 15, is contacted by cutters 12 and 13 in such manner that the grid is substantially free to float and center itself between the cutters. This is due to the fact that the leading end of the grid is supported only by the cutters.

Figure 6:
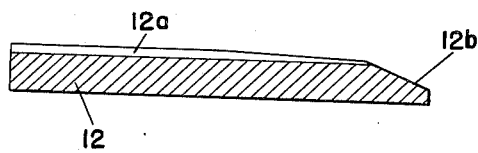
Fig. 6 is an enlarged cross-sectional view in the direction of the arrows 6—6 in Fig. 4.

To assist in this centering action of the grid cutters, in the preferred form of the invention the cutting elements or teeth 12a, as particularly shown in Fig. 6, are tapered at the entrance end. This taper of the teeth may be of the order of about one degree from the surface of the cutter. The lead edge 12b of cutter 12 is provided with a taper of about thirty degrees to the surface of the cutter. It will be apparent that with this double angle in the cutting elements, the larger protuberances or irregularities on the surfaces of the grids entering the passageway between the grid cutters may be simultaneously acted upon and reduced in thickness before the grid passes into contact with the portions of the cutting elements which produce the desired, finished thickness of the grid. The grid is centered between each portion of the cutters so that the irregularities in thickness will be removed from both sides.

Figure 7:
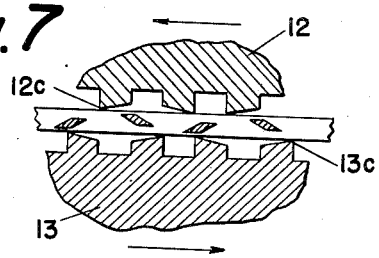
Fig. 7 is a partial cross-sectional view along the line between and in the direction of arrows 7—7 in Fig. 4.

With further reference to the arrangement of the cutting teeth, it will be observed in Fig. 7 that the cutting edges 12c and 13c on the successive teeth of cutters 12 and 13 respectively are so formed that on the stroke of the cutters in the directions of the arrows, every other tooth has its cutting edge on the leading side of the tooth for that stroke. On the succeeding stroke, that is, with the cutters moving in directions opposite to the arrows, the leading edges of the other teeth are disposed in cutting position. By so providing the cutting edges, there is made possible a cutting action on each throw or oscillation of the cutters 12 and 13 and by both cutters.

Figure 4:
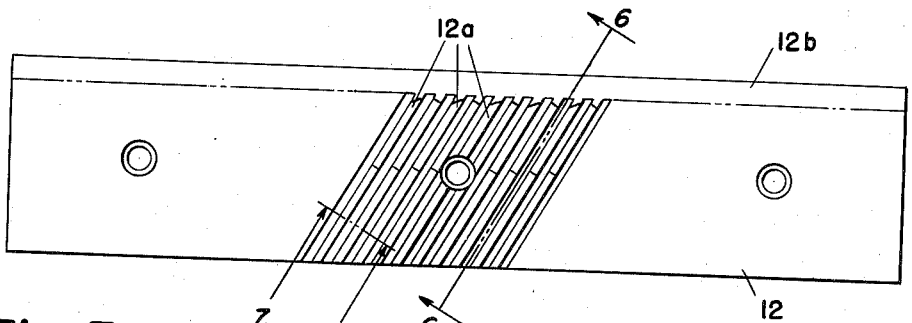
Fig. 4 is a plan view of a preferred form of the cutters shown in Figs. 1–3.
Figure 5:
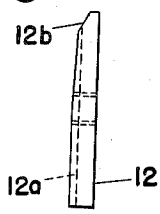
Fig. 5 is an end view of the cutter shown in Fig. 4.

The arrangement is such that the cutting actions occur simultaneously on opposite surfaces of the grid. The cutting actions, being in opposite directions, achieve equal and opposite actions and reactions for each force produced by the cutting actions of the teeth on the grid. Each cutting force is continuously in balance with an equal reaction force produced by a simultaneous cutting force on the opposite faces of the grid. These balanced forces tend to maintain the grid, without additional support, aligned in the passageway 11. Also contributing to the centering of the grid within passageway 11 is the disposition of the cutting elements 12a, as illustrated in Fig. 4, that is, with the teeth at a sixty-degree angle to the direction of oscillation of the cutter 12. The cutters 12 and 13 are constructed as identical elements and then mounted as shown in Fig. 3. The angular arrangement of teeth 12a being opposed to the angular arrangement of teeth 13a, such teeth form an acute angle of sixty degrees therebetween in the direction of the grids passing thereinto.

While the cutting teeth in Figs. 4-7 define an acute angle therebetween with the angle disposed toward the feed rollers 14 and 15, it will also be apparent to those skilled in the art that the teeth may be arranged at any suitable angle relative to the direction of travel of the oscillating cutters 12 and 13 and the passageway 11. It is obvious that other forms and configurations of cutting teeth may be equally as effective in the grid sizing machines as those shown in Figs. 4-7.

Figure 8:
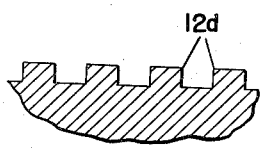
Figs. 8, 10 and 11 are partial sectional views illustrating alternative configurations for the cutting elements of the cutters shown in Figs. 4–7.
Figure 10:
Figure 11:
Figure 9:
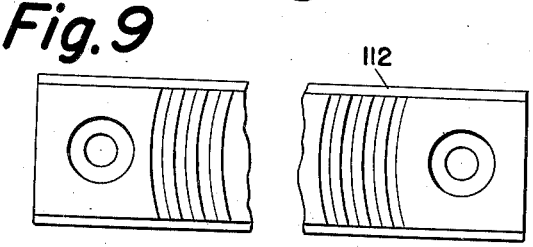
Fig. 9 is a plan view of an alternative arrangement for the cutters, similar to Fig. 4.

As shown in Fig. 8, the teeth may be of substantially rectangular cross section and provided with cutting surfaces 12D on both sides of the teeth. Figs. 10 and 11 show teeth of file-like or sawtooth configuration that can, like the teeth shown in Fig. 8, be used in conjunction with the cutter of either Fig. 4 or Fig. 9. In the latter figure an alternate form of cutter or trimmer member 112 is shown in which the cutting teeth are of arcuate form. When positioned in the machine above and below passageway 11, the arcs of the teeth of the upper and lower cutters are preferably arranged to curve toward opposite sides of the passageway.

As mentioned hereinbefore, the cutters 12 and 13 are arranged to be oscillated in a direction transverse to passageway 11, although they may be oscillated in any other suitable direction with respect to the passageway 11. For the purpose of reciprocating or oscillating the cutters 12 and 13, the cutters or trimmers are respectively mounted above and below the passageway 11 on holders 32 and 33 by means of screws 34. Cutter holders 32 and 33 are in turn slidably mounted on a pair of slide rails 35 and 36 respectively, each provided with a single longitudinal lubricating passage such as bore 37 and a plurality of transverse passageways 38 to provide lubrication between the cutter holders and the slide rails to facilitate high-speed reciprocation of the cutters transverse to the passageway. The cutter holders 32 and 33 are likewise provided with connecting-rod journals 39 and 40, respectively, through which power is transmitted by connecting rods 41 and 42. Since the cutters 12 and 13 are, for the reasons set forth above, to be driven in synchronism, the connecting rods 41 and 42 are respectively driven by eccentrics 43 and 44 rotatably mounted on a common shaft 45 which is driven by means of motor 46 through pulleys 47 and 48 and belt 49.

While the thickness of the finished grid passing between the grid cutters 12 and 13 may be adjusted by varying the thickness of shims 52, Fig. 2, interposed between the cutter holders 32 and 33 and the cutters 12 and 13, the thickness is preferably controlled by shims 53 interposed between the support bars 54 and 55 for slide rail 35.

Further defining and extending the passageway 11 is a second feed-roller means which in the preferred embodiment comprises a pair of feed rollers 61 and 62 positioned above and below the passageway 11 and vertically spaced apart. While the feed-roller means 61 and 62 may be constructed of any desired material, preferably they are made of resilient material such as rubber, so that there will be provided a friction driving engagement between the rollers and the surfaces of the grid plate passing out of the reciprocating cutters 12 and 13 without danger of marring the finished surfaces.

As particularly shown in Figs. 1 and 3, feed-roller means 61 and 62 are positioned closely adjacent the grid cutters as are the feed-roller means 14 and 15. By thus disposing the feed-roller means, although the grid plate is permitted to float freely and to center itself in passing into and out of the cutters, there is provided positive drive of the grid plate at all times through the passageway 11. The respective pairs of rollers may be driven by separate means, but in the preferred arrangement synchronous drive of the rollers is provided by a sprocket chain 63 which is driven by any suitable means such as an electric motor (not shown). Chain 63 is arranged to engage sprocket wheels 64 and 65 respectively mounted on the shafts 25 and 71 supporting rollers 14 and 61. Drive of the rollers 15 and 62 is accomplished through spur gears 66 and 67 mounted on the sprocket-driven shafts 25 and 71 respectively, and these spur gears engage similar and complementary spur gears 68 and 69 mounted on the shafts 26 and 72 which rotatably support rollers 15 and 62 respectively. To maintain the pairs of spur gears in driving engagement with each other and the grids, the bearing blocks, such as 81 and 82, in which shaft 25 is journaled are resiliently loaded, as by coil spring 83, Fig. 3. The pressure exerted by these springs is adjustable by machine screws 84 and 85. In the same manner, bearing blocks 86 and 87 which journal shaft 71 are spring loaded by coil springs 88 and screws 89 and 90.

It will be observed that the shoulders 21 and 22 of guide rails 19 and 20 extend between the exit side of the reciprocating cutters 12 and 13 and feed-roller means 61 and 62. In this way, the finished grids are guided into engagement with, and guided through, that portion of the passageway 11 defined by the space between rollers 61 and 62. In the arrangement illustrated in the drawings, particularly Fig. 1, the finished grids passing out of passageway 11 are delivered on table 75. It will be understood by those skilled in the art that in place of table 75, the exit end of passageway 11 may be directly connected to a pasting machine so that the finished grids are immediately pasted without requiring subsequent handling of the shaped grids. Alternatively, there may also be provided a conveying track or belt positioned adjacent the exit end of passageway 11 to carry the finished grids to storage or to remotely located pasting machines.

Figure 12:
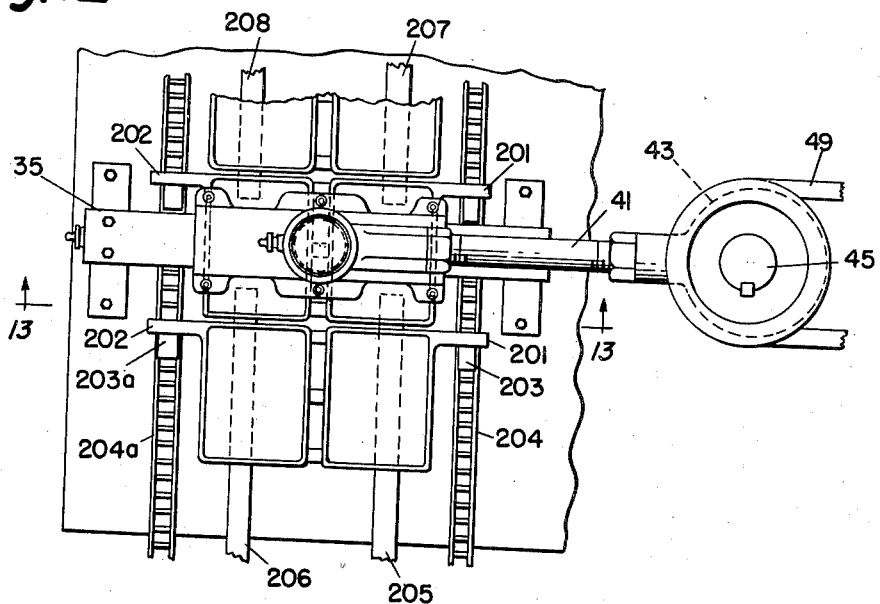
Fig. 12 is an alternative arrangement for a grid sizing machine in which the sizing machine forms an intermediate portion of a continuous flow system for grids between a casting machine and a pasting machine.
Figure 13:
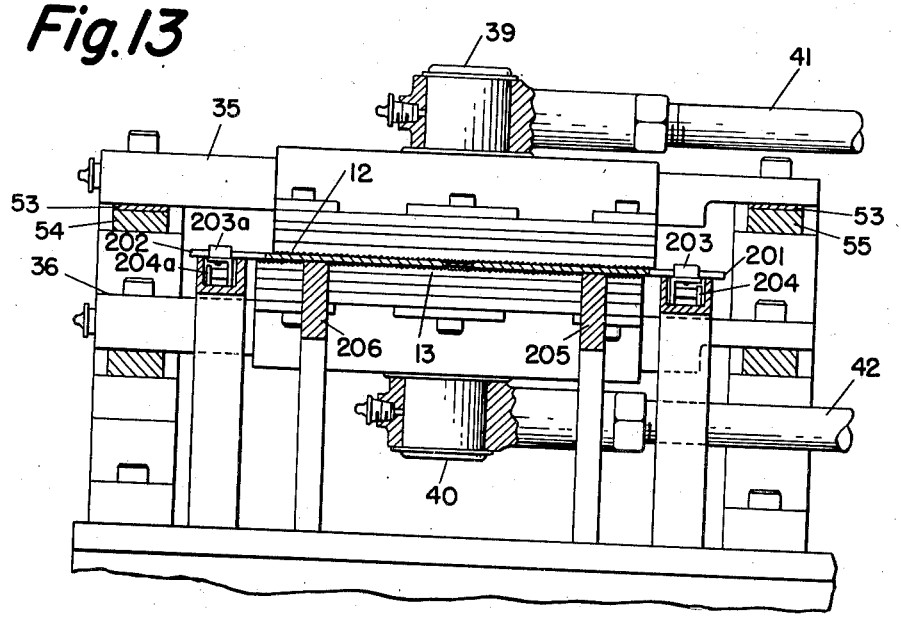
Fig. 13 is a vertical sectional view in the direction of arrows 13—13 in Fig. 12.

There is illustrated in Figs. 12 and 13 an alternative arrangement of the grid sizing machine which is particularly adapted for sizing the grids in a continuous-feed system. In such a system, the molded grids are to be delivered directly to a pasting machine and sized between the molding and pasting operation. As stated hereinabove, while individual grids may be sized, in practice, as shown in Fig. 12, the grids are frequently cast as "twins" with the terminal lugs extending toward opposite sides with the twin grids joined together in the casting operation. Such an arrangement has been take advantage of in the embodiment of the invention shown in Fig. 12 in that the terminal lugs 201 and 202 of the storage battery grids are engaged by a pair of conveyor chain dogs 203 and 203a respectively driven by conveyor chains 204 and 204a. The conveyor chains are synchronously driven and are operated to provide a predetermined line of travel for the grid from the grid molding machine through the oscillatable trimmers 12 and 13 which are constructed and arranged to operate in the same manner as disclosed hereinabove.

As particularly shown in Fig. 13 the passageway and line of travel for the grids is in part defined by a pair of longitudinal supporting members 205 and 206 which extend in the direction of the line of travel of the grids and support the grids in substantially a horizontal position during their travel toward the trimmers. However, as indicated in Fig. 12, support members 205 and 206 terminate adjacent trimmers 12 and 13 so that the leading edge of the grids is unsupported at the time the grids engage the trimmers, and during travel through the trimmers the grids are supported vertically only by the opposed and oscillating trimmers. Upon passage out of the trimmers the grids are again supported by the longitudinally extending members 207 and 208, which likewise terminate adjacent the trimmers. The trailing edge is permitted to float between the trimmers as in the arrangement of Figs. 1–3.

As distinguished from the arrangements of Figs. 1–3, the embodiment shown in Figs. 12 and 13 provides a driving means throughout travel of the grid from the point of entry of the molded grids from the molding machine, through the grid sizing operation and until the grids are delivered to the pasting machine. This is accomplished by conveyor chain dogs 203 and 203a which engage lugs 201 and 202 of the grid and together with the chain pass directly through the space between the slide rails 35 and 36. While the grids are in this manner continuously driven, they are free to center themselves in the passageway between the grid trimmers 12 and 13 in the same manner as in the arrangement of Figs. 1–3, since the grids are supported during passage therethrough only by the trimmers themselves.

In operation of the grid sizing or trimming machine described hereinabove, it will be understood that the grid cutters 12 and 13 will be adjusted for desired clearance therebetween by insertion of shims 53 between slide rail 35 and end support bars 54 and 55. The drive motor 46 is operated at a desired speed to produce high-speed oscillation or reciprocation of the grid cutters. In a commercial form of the present apparatus, Figs. 1–3, the grid cutters are oscillated at about 3600 strokes per minute. Simultaneously, the drive of the feed-roller means 14—15, 61—62 is initiated by driving chain 63 at a suitable speed which rotates in synchronism the four feed rollers through gears 66—69. With the feed-roller means operating and the cutters 12 and 13 oscillating, an individual grid may be fed into the passageway 11 by manually pushing the grid between the guide strips 16 and 17 on table 18 and over the shoulders 21 and 22 until the grid engages the knurled wheels 14a, 14b, 15a and 15b. The knurled surfaces of wheels 14a—15b are able to bite into the soft metal of the grid. As mentioned hereinabove, the knurled wheels are spaced apart in such manner that this bite or slight deformation of the surface of the soft metal of the grid insures positive drive of the grid in a direction to urge the leading end of the grid into the portion of passageway 11 between grids 12 and 13. As the leading edge of the grid is free to seek the center of the passageway between the cutters, the opposite sides of the grid are simultaneously acted upon by cutting actions in opposite directions. Both cutting actions are transverse to the direction in which the grid is driven by feed-roller means 14 and 15.

As the grid is driven forward and the trailing edge thereof approaches contact with feed rollers 14 and 15, the leading edge of the grid is in a position within passageway 11 for contact with rollers 61 and 62. Thus, there is at all times a positive drive of the grid plate through the passageway. However, by disposing the feed rollers 14—15, 61—62 at properly spaced intervals for the size of the grid being operated upon, the grid is restrained at both ends for a minimum length of the grid. As the trailing edge of the grid passes out of engagement with rollers 14 and 15 and the grid is driven forward by action of rollers 61 and 62, the trailing edge is free to center itself between cutters 12 and 13, thereby permitting the imperfections of the grid to be removed from the surface on which they occur.

In summary, it will be seen that there is provided an improved apparatus for trimming or sizing molded grids for storage batteries. As described in detail, the construction and operation of the grid sizing machine is such that there is made possible the sizing of grids advanced into engagement with a pair of oscillatory trimmers or cutters disposed on opposite sides of a passageway under the action of a pair of feeding devices, such as rollers 14 and 15 or conveyor chains 204 and 204a.

In accordance with the present invention, the leading edge of the grid plate which is to be sized is permitted to float between the oscillatory cutters which are preferably arranged to cut simultaneously in opposite directions, transverse to the direction of travel. By virtue of these equal and opposite cutting forces acting simultaneously in opposite directions on the surfaces of the grid, the grid is maintained in a centered position both vertically and horizontally in the predetermined passageway 11, even though the advancing end is not rigidly restrained during the application of the cutting forces.

Further in accordance with the invention, second feed-roller means, preferably having resilient surfaces for positive engagement with the finished surface of a grid are so disposed that the grid passing through the trimming machine is at all times positively driven. However, in the preferred form of the invention, the positive and synchronous drive of both the leading and trailing ends of the grid is maintained for a minimum length of said grid. In this way, throughout the major portion of the travel of the grid through the machine, the grid is free to seek the path of least resistance through the cutters. Since this path is in the center of the passageway between cutters 12 and 13, the grid centers itself vertically between the oscillatory cutters.

Trimming machines of the type disclosed herein may be used either alone or in conjunction with additional equipment, such as with conveying means and feeding means for supplying grids from the molding operation to the trimmer. Additionally, the trimming machine may be provided as a portion of a supply system for grids being advanced to a pasting machine from the casting machine.

From the foregoing description of the preferred and alternate forms of apparatus, it will be apparent that there is performed the method of the present invention which is capable of being performed independent of the particular machine. In accordance with the invention, the grids may be pushed either by feeding means such as feed rollers, conveyor chains, or by hand along a predetermined line of travel, and with the leading end unsupported. The thickness of the grid is then reduced by progressively cutting or abrading the surface including protuberances from one face of the grid while concurrently cutting or abrading the other face in the opposite direction. Reversal of the cutting or abrading is at a relatively high rate as the grid is moved forward. As the cutting actions on the grid approach the trailing end of the grid, the grid is pulled forward along the predetermined line of travel with the trailing end of the grid being unsupported.

While numerous modifications and changes in the apparatus described hereinabove will occur to those skilled in the art, all such modifications and changes as fall within the scope of the appended claims are intended to be embraced thereby. Among such changes which will suggest themselves are various additional forms of grid-cutting or abrading elements, several alternative embodiments of which have been illustrated in Figs. 8 to 11 inclusive. Such alternatives are meant to be illustrative and do not exclude obvious equivalents thereof.

What is claimed is:

1. A grid sizing machine having a passageway for advancing an individual grid therethrough comprising first power-driven grid-engaging roller means for individually engaging and advancing a single grid progressively through the passageway, a pair of oscillatory trimmers disposed on opposite sides of the passageway for simultaneous cutting engagement with the opposite faces of a grid while the grid is advancing under the action of said roller means, second power-driven roller means for engaging the trimmed grid and positively advancing the grid out of engagement with said trimmers, said first and second roller means being disposed so that a single grid traversing said passageway is continuously engaged by at least one of said roller means, and means for synchronously driving said trimmers, and said trimmers having cutting elements disposed to cut in opposite directions simultaneously on both sides of a grid, said cutting element of each of said trimmers being disposed at an angle to the direction of oscillation of said trimmers.

2. A grid sizing machine having a passageway for advancing an individual grid therethrough comprising first power-driven grid-engaging roller means for individually engaging and advancing a single grid progressively through the passageway, a pair of oscillatory trimmers disposed on opposite sides of the passageway for simultaneous cutting engagement with the opposite faces of a grid while the grid is advancing under the action of said roller means, second power-driven roller means for engaging the trimmed grid and positively advancing the grid out of engagement with said trimmers, said first and second roller means being disposed so that a single grid traversing said passageway is continuously engaged by at least one of said roller means, and means for synchronously driving said trimmers, said trimmers having cutting elements disposed to cut in opposite directions simultaneously on both sides of a grid, said cutting elements of each of said trimmers being disposed at an angle to the direction of oscillation of said trimmers, and said cutting elements of one of said trimmers being at an acute angle to the cutting elements of the other trimmer.

3. A sizing machine for storage battery grids comprising a pair of grid-driving means spaced one from the other and establishing a line of travel of grids through the intervening space between them, trimmers having cutting edges above and below the line of travel of the grids with a minimum space therebetween corresponding to the final thickness desired for each grid passing therethrough, means for driving said trimmers in opposite directions and at an angle to the line of travel of the grids established by said driving means for progressively reducing in thickness the grids in regions thereof where they exceed in thickness the spacing between the trimmers, said driving means having a speed of operation sufficiently high to assure progressive contact of said trimmers with each grid as it is moved between said trimmers, the leading end of each grid being initially unsupported and thereafter the trailing end of the grid being unsupported, the lack of support of first one and then the other end of each grid as it enters the trimmers assuring at all times the centering of the grid between the trimmers for an equalized cutting action of the trimmers against the respective faces of each grid.

4. A sizing machine for twin-cast storage battery grids comprising a grid passageway defined in part by a pair of opposed oscillatory cutters for receiving the unsupported leading edge of the grids, driving means for oscillating said cutters to act simultaneously upon opposite surfaces of said grids, and feeding means for driving said grids into engagement with said cutters comprising a pair of conveyor chains including dogs driven thereby for engaging the oppositely extending terminal lugs of said grids and feeding said grids through said cutters.

5. A sizing machine for twin-cast storage battery grids comprising a grid passageway defined in part by a pair of opposed oscillatory cutters for receiving the unsupported leading edge of the grids, driving means for oscillating said cutters to act simultaneously upon opposite surfaces of said grids, feeding means for driving said grids into engagement with said cutters comprising a pair of conveyor chains including dogs driven thereby for engaging the oppositely extending terminal lugs of said grids and feeding said grids through said cutters, and grid supporting members extending longitudinally in the direction of travel of said grids to define extensions of said passageway, said members terminating adjacent said cutters to permit the grids to center themselves between the cutters during travel therethrough.

6. A sizing machine for storage battery grids comprising a pair of grid-driving means spaced one from the other and establishing a line of travel of grids through the intervening space between them, trimmers having opposed cutting edges disposed respectively above and below the line of travel of the grids, means slidingly supporting said trimmers for oscillation transversely of said line of travel of said grids and for establishing a predetermined spacing between them, said opposed cutting edges along an exit region of said trimmers having a spacing corresponding to the final thickness desired for each grid passing between them, said opposed cutting edges along an inlet region having a greater spacing than said final desired thickness, and means for reciprocating said trimmers in opposite directions for progressively reducing in thickness the grids as they pass between said opposed cutting edges, said opposed cutting edges being disposed at an angle to the direction of movement of said trimmers, said grid-driving means having a spacing less than that of the grid taken lengthwise of said intervening space so that the leading end of each grid is initially unsupported and thereafter the trailing end of the grid is unsupported, the lack of support of first one and then the other end of each grid as it passes through said trimmers by way of said inlet region and said outlet region assuring at all times the centering of the grid between said trimmers for an equalized cutting action of the trimmers against the respective faces of each grid.

7. The sizing machine of claim 6 in which said pair of grid-driving means respectively comprises a pair of metal rollers having knurled surfaces resiliently pressed against each grid to form a mechanical driving connection therewith to move the leading end of each grid through said trimmers, and a second pair of rollers having resilient surfaces disposed frictionally to engage first said leading end and then the remainder of each grid to remove it from said trimmers.

References Cited in the file of this patent

UNITED STATES PATENTS

| | | |
|---|---|---|
| 1,595,337 | Bradley | Aug. 10, 1926 |
| 2,012,555 | Walker | Aug. 27, 1935 |
| 2,098,808 | Lund | Nov. 9, 1937 |
| 2,105,637 | Davis | Jan. 18, 1938 |
| 2,187,485 | Borgart | Jan. 16, 1940 |
| 2,384,164 | Gerung | Sept. 4, 1945 |
| 2,602,378 | Morton | July 8, 1952 |